UNITED STATES PATENT OFFICE.

PAUL ASKENASY, OF KARLSRUHE, GERMANY, ASSIGNOR TO CHEMISCH METALLUR-GISCHE INDUSTRIEGESELLSCHAFT MIT BESCHRÄNKTER HAFTUNG, OF BERLIN, GERMANY, A CORPORATION OF GERMANY.

METHOD OF PRODUCING WHITE ZIRCONIUM OXID FREE OF IRON.

1,158,769.   Specification of Letters Patent.   Patented Nov. 2, 1915.

No Drawing.   Application filed April 30, 1913.   Serial No. 764,498.

*To all whom it may concern:*

Be it known that I, PAUL ASKENASY, professor of chemistry, a citizen of Germany, residing at Karlsruhe, in Germany, have invented certain new and useful Improvements in Methods of Producing White Zirconium Oxid Free of Iron, of which the following is a specification.

My invention relates to a method of producing white zirconium oxid free of iron. According to methods described in literature zirconium should be separable from iron by boiling the much diluted neutral or acid solution of the chlorids. An examination of these statements showed that is not possible to obtain by such method a zirconium oxid free of iron which would be very valuable for the enameling industry. In the product thus obtained varying quantities of iron are always found, which will cause a discoloration in annealing. Also the other methods for separating zirconium from iron and the other elements of the iron group do not give a practically serviceable result, that is either the separation of iron and zirconium is not complete or it is too expensive.

According to the present method zirconium oxid may be obtained in a very simple manner, free from all discoloring substances, and also impurities such as alumina, lime and the like, by a, if necessary neutralized, mineral (for instance hydrochloric or sulfuric) acid solution of zirconium being heated in closed vessels to temperatures which are above the boiling point of the solution at ordinary pressure. Zirconium oxy-hydrate will be separated which can be freed from the solution by filtering, centrifuging and washing. After annealing a product of a snowwhite color is obtained.

It is essential for the method, that the zirconium salts, for instance the chlorids or oxychlorids are split up into free hydrochloric acid (or the sulfates into free sulfuric acid) and zirconium oxid free of or poor in acid.

Example 1: A nine per cent. solution of zirconium hydroxid in hydrochloric acid is prepared by fusing Brazilian zirconium ore with alkali, then after complete reaction removing the alkali by washing it out with water. The remaining zirconium hydroxid is impure because it contains iron and other substances such as alkaline earths. This impure substance is dissolved in hydrochloric acid and the solution diluted until a zirconium chlorid solution containing 9% zirconium hydroxid is obtained. The zirconium hydroxid in this solution still contains about 5% of the chlorid of iron and of the alkaline earths as an impurity. The solution is heated in an autoclave for 5 hours to a temperature of 200° C, and in this way the zirconium chlorid is transposed into zirconium hydroxid and free hydrochloric acid. The thus purified zirconium hydroxid separates out in a well filtrable form and may be recovered by centrifuging and repeated washing with highly diluted hot hydrochloric acid. The filtrate contains the non-decomposed chlorids of iron, and of the alkaline earths, such as magnesium and calcium together with small quantities of zirconium salts.

Example 2: If under the same conditions as stated in example 1 sulfuric acid is used in place of hydrochloric acid, or a mixture of both acids, and the iron is contained in the solution in form of a ferrous compound, a basic sulfate of zirconium will separate, which is easily filtered and washed and will yield a perfectly white product after annealing.

Example 3: A zirconiate of alkali or earth alkali containing some iron is heated with the quantity of hydrochloric acid sufficient for dissolving the iron and the alkalis or earth alkalis for 6 hours in a closed vessel to a temperature of about 150° C. The resulting solution will contain all impurities and a deposit of zirconium oxid, which after washing and annealing proves to be pure.

What I claim as new and desire to secure by Letters Patent of the United States is:

The process of producing white zirconium oxid free from iron and other discoloring impurities, which consists in heating a solution of a zirconium salt of a mineral acid, containing such impurities, under pressure to temperatures which are above the boiling point of the liquid at ordinary pressure, and separating the product thereby precipitated from the solution containing the impurities.

In witness whereof, I have hereunto set my hand this seventeenth day of April, 1913.

PAUL ASKENASY.

Witnesses:
 JOSEPH PFEIFFER,
 HEINRICH HEULE.